Figure 3:
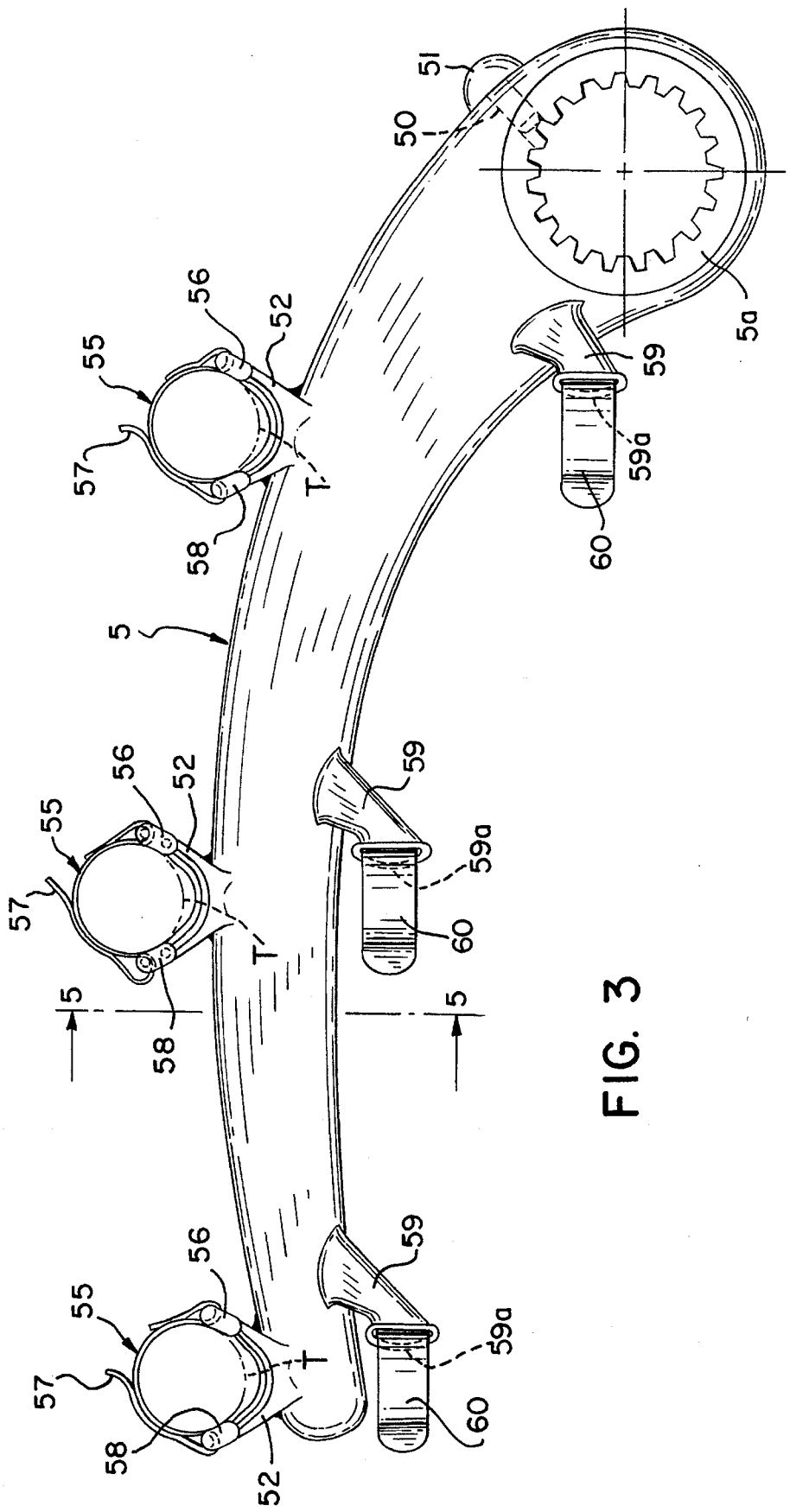

United States Patent [19]
Pedrini

[11] Patent Number: 5,495,970
[45] Date of Patent: Mar. 5, 1996

[54] DEVICE FOR CARRYING ARTICLES, PARTICULARLY BICYCLES, ON THE REAR PORTION OF A MOTOR-VEHICLE

[76] Inventor: Fabio Pedrini, Via Zamboni 1, scala A, piano 1, int. 3, 40125 Bologna, Italy

[21] Appl. No.: 399,389

[22] Filed: Mar. 6, 1995

[30] Foreign Application Priority Data

Mar. 7, 1994 [IT] Italy ................... TO94A0155

[51] Int. Cl.⁶ .................. B60R 9/00; B60R 9/04
[52] U.S. Cl. ............ 224/314; 224/321; 224/329; 224/924; 463/4; 211/17
[58] Field of Search ............... 224/309, 314, 224/319, 329, 321, 315, 924; 403/3, 4, 359; 211/100, 71, 17, 18, 22; 248/291, 284

[56] References Cited

U.S. PATENT DOCUMENTS

| | | | |
|---|---|---|---|
| 4,513,897 | 4/1985 | Graber | 224/314 |
| 4,830,250 | 5/1989 | Newbold et al. | 224/314 |
| 5,195,670 | 3/1993 | Piretti et al. | 224/321 |
| 5,363,996 | 11/1994 | Raaber et al. | 224/314 |

*Primary Examiner*—J. Casimer Jacyna
*Assistant Examiner*—Timothy L. Maust
*Attorney, Agent, or Firm*—Lathrop & Clark

[57] ABSTRACT

A device for carrying articles, in particular bicycles, on the rear portion of a motor-vehicle, has three structures having respective hubs mounted on a splined shaft, so that each structure may be easily separated from the splined portion of the shaft and mounted again in a different angular position relative to the shaft.

10 Claims, 3 Drawing Sheets

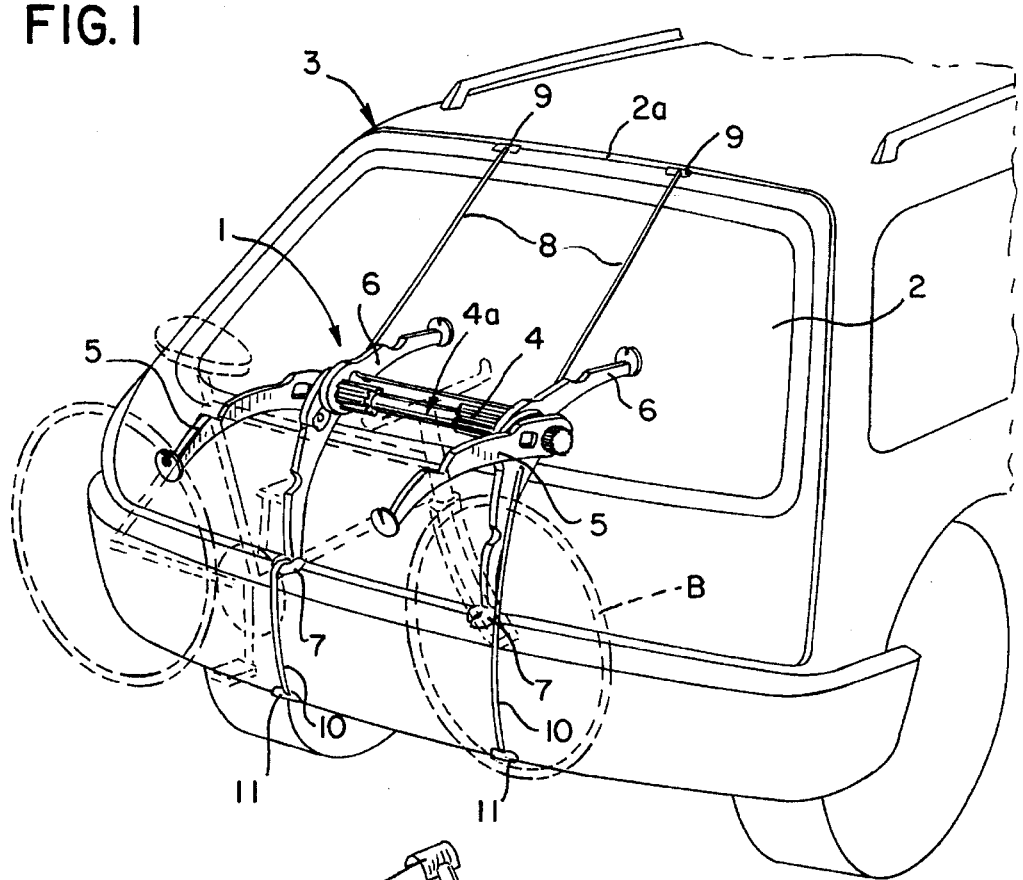
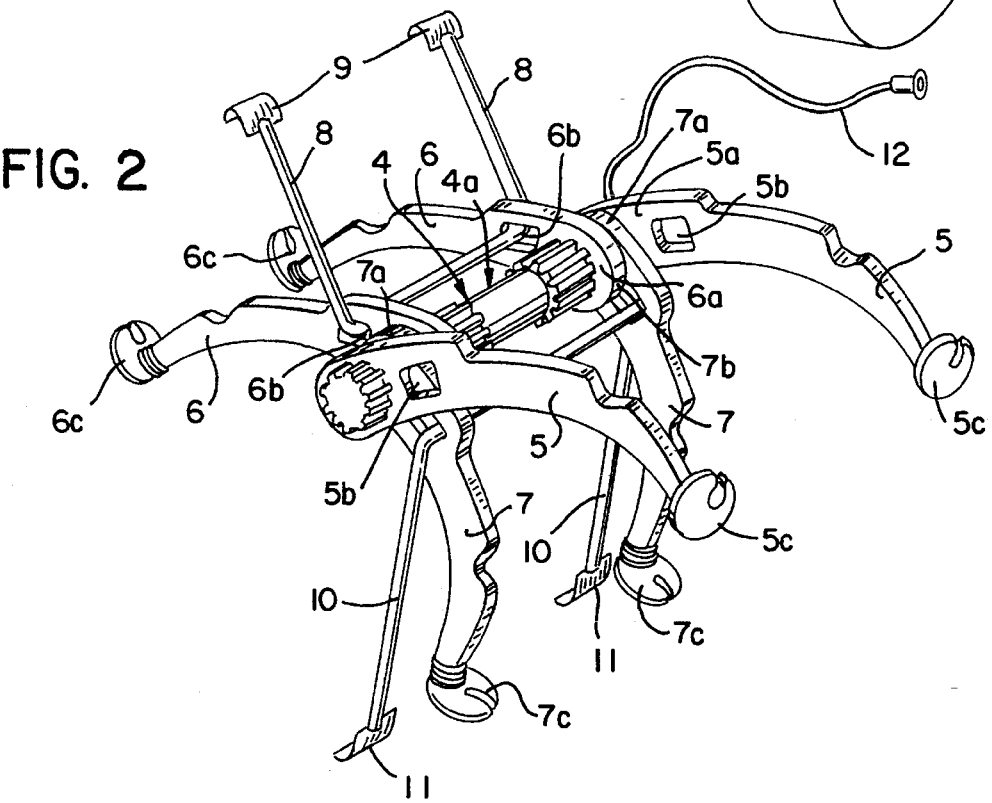

5,495,970

DEVICE FOR CARRYING ARTICLES, PARTICULARLY BICYCLES, ON THE REAR PORTION OF A MOTOR-VEHICLE

The present invention relates to devices for carrying articles, particularly bicycles, on the rear portion of a motor-vehicle, of the type comprising:

at least one first structure for carrying articles to be transported, said first structure having at least one hub, a second and a third structures for supporting said device on the rear portion of the motor-vehicle, each of said second and third structures having at least one hub, and feet for abutment against the rear portion of the motor-vehicle, and a connecting member rigidly connecting said hubs of said first, second and third structures to each other.

A device of the above indicated type is for example described and shown in U.S. Pat. No. 4,830,250. In the device known from this document, the three above mentioned structures have hubs which are rotatably mounted around a bolt constituting said connecting member and are provided with disengageable locking means for locking said hubs in various angular positions relative to each other. Thus, the three structures may be locked at corresponding positions relative to each other so as to adapt themselves in the best possible way to the configuration of the rear portion of the motor-vehicle on which the device has to be mounted. At the same time, due to the above indicated features, the above mentioned known device may be folded in a position of minimum bulk, for transportation, wherein all the three structures substantially lie in a same radial plane with respect to the axis of the connecting bolt.

The object of the present invention is that of providing a device having the features indicated at the beginning of the present description, which has the same advantages of simplicity of use and effectiveness of the above mentioned known device, while having at the same time a substantially simpler and less costly structure.

In order to achieve this object, the invention provides a device of the type indicated at the beginning of the present description, characterized in that said connecting member comprises an elongated bar having a non-circular cross-section on at least a portion of its length, and that the hubs of at least two of said first, second and third structures each have a central aperture receiving said bar, said aperture having a non-circular cross-section corresponding to that of said bar, so that these two structures may be mounted on said bar in different angular positions relative to each other and relative to the remaining one of said three structures.

As a result of the above indicated configuration and arrangement, the above mentioned three structures, when mounted on the bar, are rigidly rotationally connected to this bar, so that they cannot rotate relative thereto. If one wishes to change the angular position of one or more of said structures relative to the remaining structures, it is necessary to withdraw the hub of this structure from the bar so as to completely separate this hub from the bar, whereupon the hub may be mounted again on the bar in the new requested angular position.

In a preferred embodiment, the above mentioned connecting element is in form of a splined shaft and all the three above mentioned structures have hubs having central apertures with toothed coupling surfaces cooperating with said splined shaft. Preferably, each of said first, second and third structures comprises two separate arms projecting in a cantilever fashion from said bar and each having a hub connected to said bar.

The whole structure of the device according to the preferred embodiment of the invention is therefore much simplified relative to the Prior Art, since it is substantially made by the three pairs of the above mentioned arms, each having a hub with a central circular aperture having a toothed profile corresponding to the toothed profile of the cross-section of the bar. Each arm may then be mounted on the bar by causing it to slide thereon from one end and axially locking means of any known type may of course be provided for locking the various hubs in their axial position on the bar, once they have been mounted on the bar. If one desires, one of the three pairs of arms may be connected rigidly and permanently to the bar, since it is sufficient to give the possibility of a different angular positioning on the bar relative to the two remaining pairs of arms.

Furthermore, in the above mentioned preferred embodiment of the invention, the splined shaft has a central portion with a reduced diameter, so as to enable two of said hubs which are closer to the ends of said central portion to be temporarily moved to said central portion in order to change the angular orientation thereof, without the need of separating these hubs from the shaft.

Moreover, said feet of the second and third structures of the device according to the invention are preferably pivotally connected to said second and third structures so as to better adapt to any configuration of the rear portion of the motor-vehicle.

According to a further preferred feature, both the arms forming said first structure are provided with upper seats, each for receiving a horizontal tube of a bicycle to be transported and being provided with a tube securing strap. Moreover, these arms are also provided with projections having end portions with abutment surfaces for cooperation with a diagonal tube of a bicycle to be transported, each of said projections being also provided with a tube securing strap. Preferably, said seats and projections are formed in a one-piece body of plastic material with said arm.

Figure 4:
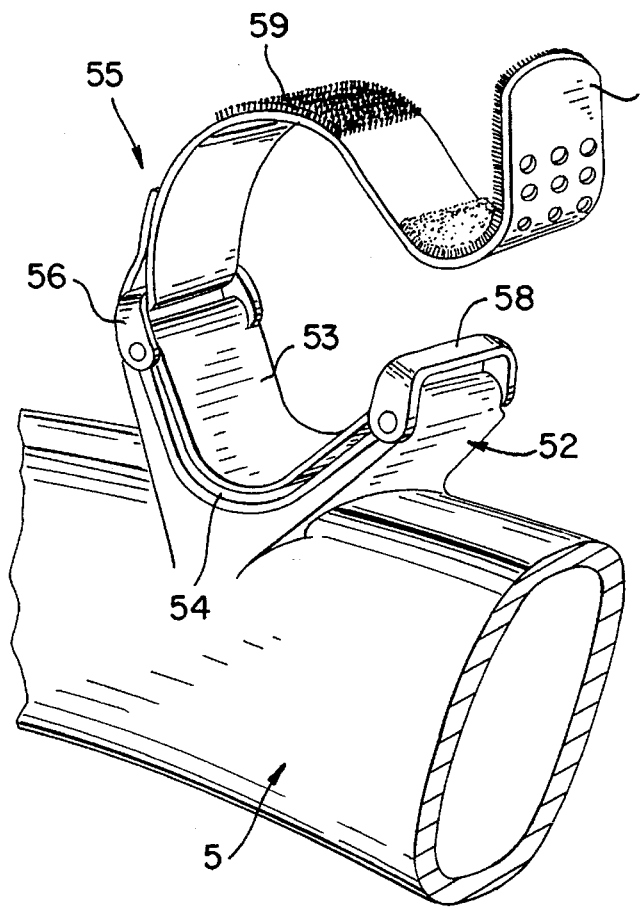
Figure 5:
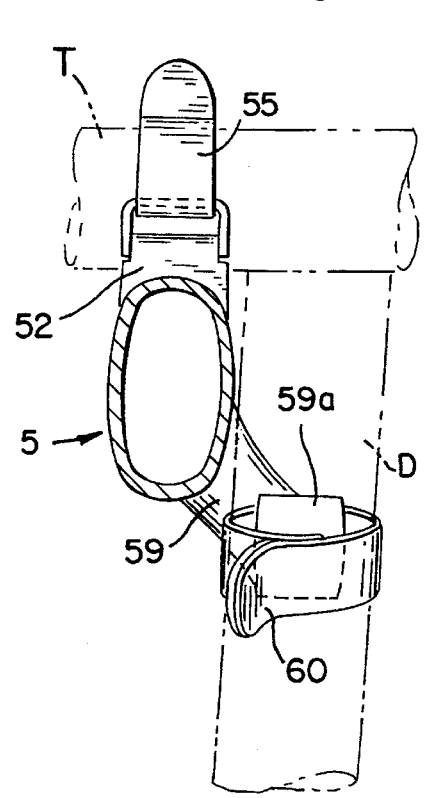
Figure 6:
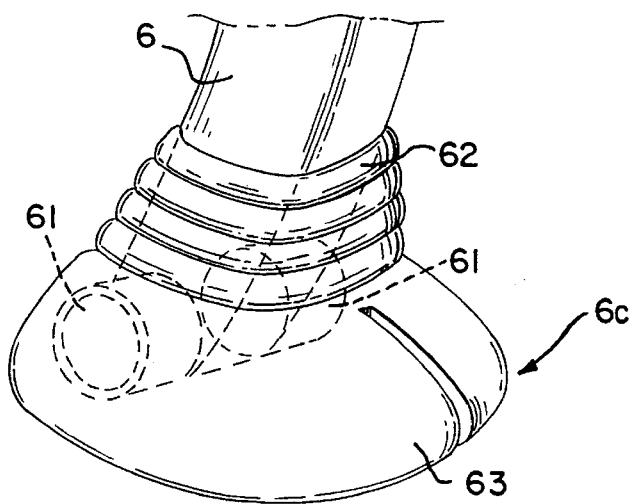

Further features and advantages of the invention will become apparent from the description which follows with reference to the annexed drawings, given purely by way of non limiting example, in which:

FIG. 1 is a perspective partial view of the rear portion of the motor vehicle provided with a device according to the invention, FIG. 2 is a perspective view at an enlarged scale of the device of FIG. 1, FIG. 3 is a side view at an enlarged scale of a detail of FIG. 2, according to a variant, FIG. 4 is a perspective view at an enlarged scale of a detail of FIG. 3, FIG. 5 is a cross-section taken along line V—V of FIG. 3, and FIG. 6 is a perspective view at an enlarged scale of another detail of FIG. 2.

In the drawings, reference numeral 1 generally designates a device for carrying one or more bicycles on the rear portion 2 of a motor-vehicle 3. Device 1 comprises a bar 4 in form of a splined Shaft, e.g. of metal, having a circular cross-section with a toothed profile. On bar 4 there are mounted in a cantilever fashion three pairs of arms 5, 6, 7. Each of these arms incorporates a hub 5a, 6a, 7a each having a central aperture with a toothed profile corresponding to the toothed profile of the cross-section of bar 4, so that all said arms 5, 6, 7 may be connected in a fixed angular position on the bar 4 by causing the respective hubs to slide on the bar from one end thereof.

As shown in FIG. 1, the two arms 5 form a first structure connected to bar 4 for carrying one or more bicycles B, whereas arms 6, 7 form a second and a third structures for supporting device 1 on the rear portion 2 of the motor-vehicle 3.

Naturally, the angular positions of the three pairs of arms 5, 6, 7 relative to each other have to be varied as a function of the particular configuration of the rear portion of the motor-vehicle. This can be done very easily by the user by withdrawing the arms from bar 4 and mounting again them on the bar in a new requested position. Once the arms have been mounted on the bar, the respective hubs are axially locked on the bar by locking means of any known type, such as a bolt 50 (FIG. 3), provided with a knob 51, which is carried by the hub and is adapted to engage the toothed surface of the splined shaft 4 so as to restrain the hub from moving axially with respect to shaft 4.

The device 1 is held on its position of use on the rear portion 2 of the motor-vehicle by belts. A first belt 8 is caused to pass through apertures 6b of arms 6 and ends with end hooks 9 which are hooked for example to the upper edge 2a of the rear door of the motor-vehicle. A second belt 10 is caused to pass through apertures 7b of arms 7 and ends with end hooks 11 which are hooked for example to the rear bumper of the motor vehicle. Finally, one of the two arms 5 is provided with an elastic cord 12 for connection to the bicycle. Arms 6, 7 have feet 6c, 7c for abutment against the motor-vehicle structure.

As it clearly appears from the foregoing description, the device according to the invention is characterized by an extremely simple structure, which can be manufactured at a low cost, and can be easily and rapidly assembled and mounted on the motor-vehicle. In the dismantled condition of the arms, the various parts of the structure may be arranged in a packaging container having a reduced bulk, for transportation.

Naturally, while the principle of the invention remains the same, the embodiments and the details of construction may widely vary with respect to what has been described and shown purely by way of example, without departing from the scope of the present invention.

For example, if one desires, one of the three pairs of arms 5, 6, 7 may be rigidly and permanently connected to the bar 4, so that it cannot be dismantled, since it is sufficient to provide a splined coupling between bar 4 and the two remaining pairs of arms in order to achieve the possibility of different angular positions of each pair of arms relative to the other.

Furthermore, the structure and the configuration of the arms may also be different from that shown. Finally, the three structures respectively serving for carrying the bicycle and for supporting the device on the rear portion of the motor-vehicle may be made differently from what has been illustrated. For example, the two arms 6 may be replaced by a single central arm ending at its free end with an enlarged abutting foot.

In the preferred embodiment shown in FIG. 2, the splined shaft 4 has a central portion 4a of reduced diameter having no splines, which enables the two arms 6 which are closer to the ends of the central portion 4a to be temporarily moved to the central portion for changing the angular orientation of the arms 6 without the need of separating them from the splined shaft 4. Thus, the two arms 7 may be rigidly secured to shaft 4, whereas only the two arms 5 which are mounted more closely to the ends of shaft 4, have to be completely separated from this shaft in order to change their angular orientation.

FIGS. 3–5 show a preferred embodiment of each arm 5, wherein this arm has a one-piece structure of plastic material including generally V-shaped upper seats 52, each for receiving a horizontal tube T (shown in dotted lines) of a bicycle to be transported. As shown in FIG. 4, each seat 52 has a film 53 superimposed on the upper surface of the V-shaped seat 52 and spaced therefrom by a gap 54 so as to elastically support the corresponding tube T. Film 53 is also formed in a one-piece body of plastic material with the respective seat 52 and arm 5. As also shown in FIGS. 3–5, each seat 52 is provided with a tube securing strap 55 having one end secured to a link 56 connected to seat 52, and the opposite free end 57 which can be passed under a link 58 and secured to a Velcro-type surface 59 provided on strap 55, as shown in FIG. 3. Arm 5 has also lower projections 59 which are also formed in one-piece with the structure of arm 5 and have abutment surfaces 59a, for abutment of a diagonal tube D of a bicycle to be transported, indicated by dotted lines in FIG. 5. Also abutment surfaces 59a are defined by hollow end portions of projections 59 so as to enable abutment surfaces 59a to elastically cooperate with the respective tubes D. Also projections 59a are provided with tube securing straps 60, for example with a Velcro-type lock.

FIG. 6 shows a foot 6c which is made of plastic material and is pivotally mounted on two coaxial cylindrical bolts 61 projecting from opposite sides of the end of arm 6. Foot 6c has a body of plastic material including a bellow-like portion 62 which is mounted on arm 6 and a foot portion 63 which has, on its inner surface, cylindrical seats (not shown) cooperating with bolts 61 so that body 63 is pivotally mounted on arm 6 around the axis of bolts 61. The material of body 63 is sufficiently flexible to allow the inner seats of body 63 to be snapped on bolts 61.

As indicated above, the embodiments and the details of construction may however vary widely with respect to the preferred embodiment which has been shown herein.

For example, bar 4 and the central apertures of hubs 5a, 6a, 7a could have a polygonal cross-section.

I claim:

1. Device for carrying articles, in particular bicycles, on the rear portion of a motor-vehicle, comprising:
   at least one first structure for carrying articles to be transported, said first structure having at least one hub,
   a second and a third structures for supporting said device on the rear portion of the motor-vehicle, each of said second and third structures having at least one hub and feet for abutment against the rear portion of the motor-vehicle,
   a connecting member, rigidly connecting said hubs of said first, second and third structures to each other,
   wherein said connecting member comprises an elongated bar having a non-circular cross-section at least on a portion of its length, and wherein the hubs of at least two of said first, second and third structures each have a central aperture receiving said bar, said aperture having a non-circular cross-section corresponding to that of said bar, so that these two structures mount on said bar in different angular positions relative to each other and relative to the remaining one of said three structures.

2. Carrying device according to claim 1, wherein said bar is in the form of a splined shaft and that all of said three structures have hubs having central apertures with toothed coupling surfaces cooperating with said splined shaft.

3. Carrying device according to claim 2, wherein each of said first, second and third structures comprises two separate arms projecting in a cantilever fashion from said bar and each having a hub connected to said bar.

4. Carrying device according to claim 3, wherein said arms constituting said second and third structures have apertures for passage of two securing belts each of which has end hooks for connection to a portion of the motor-vehicle.

5. Carrying device according to claim 3, wherein said splined shaft has a central portion with a reduced diameter, so as to enable two of said hubs which are closer to the ends of said central portion to be temporarily moved to said central portion in order to change the angular orientation thereof, without the need of separating these hubs from said shaft.

6. Carrying device according to claim 1, wherein said feet are pivotally connected to said second and third structures.

7. Carrying device according to claim 3, wherein both said arms forming said first structure are provided with upper seats, each for receiving a horizontal tube of a bicycle to be transported, each of said seats being provided with a tube securing strap.

8. Carrying device according to claim 7, wherein each arm of said first structure is also provided with projections having end portions with abutment surfaces for cooperation with a diagonal tube of a bicycle to be transported, each of said projections being also provided with a tube securing strap.

9. Carrying device according to claim 8, wherein said seats and said projections are formed in a one-piece body of plastic material with said arm.

10. Carrying device according to claim 9, wherein each of said seats and said projections has an inner cavity so as to elastically cooperate with the corresponding tube.

* * * * *